United States Patent [19]

Robertson

[11] Patent Number: 4,832,262

[45] Date of Patent: May 23, 1989

[54] AUTOMOBILE WINDOW WASHING APPARATUS AND HEAT EXCHANGER THEREFOR

[76] Inventor: Harry J. Robertson, Wesley Dr., Salisbury, Md. 21801

[21] Appl. No.: 940,799

[22] Filed: Dec. 12, 1986

[51] Int. Cl.$^4$ ............................................... B05B 1/24
[52] U.S. Cl. ................................. 239/129; 239/284.1; 15/250.01; 15/250.05; 165/52
[58] Field of Search ......................... 15/250.05, 250.01; 239/284.1, 129, 130, 131; 165/51, 52, 139

[56] References Cited

U.S. PATENT DOCUMENTS

| | | | |
|---|---|---|---|
| 1,115,745 | 11/1914 | Sibley | 165/52 |
| 1,226,107 | 5/1917 | Neville | 165/52 |
| 1,244,971 | 10/1977 | Fisher | 165/41 |
| 1,776,762 | 9/1930 | Turner | 165/51 |
| 3,324,533 | 6/1967 | Watteau | 165/51 X |
| 3,366,336 | 1/1968 | Neuschwanger et al. | 239/131 X |
| 3,756,510 | 9/1973 | Nitterl et al. | 239/129 |
| 4,177,928 | 12/1979 | Bergkvist | 239/129 |
| 4,354,548 | 10/1982 | Carlsson | 239/130 X |

FOREIGN PATENT DOCUMENTS

| | | | |
|---|---|---|---|
| 2104321 | 8/1972 | Fed. Rep. of Germany | 239/284.2 |
| 2627402 | 12/1977 | Fed. Rep. of Germany | 239/129 |
| 148759 | 8/1985 | Japan | 239/129 |

*Primary Examiner*—Peter Feldman
*Attorney, Agent, or Firm*—Hurt, Richardson, Garner, Todd & Cadenhead

[57] ABSTRACT

A heat exchanger member contoured to fit along one side of an exhaust pipe is retained in place on the exhaust pipe by clamps. In one form of the invention the exhaust pipe forms a part of the heat exchanger reservoir in which case leak preventive adhesive secures the heat exchanger member to the pipe. The heat exchanger member is provided with intake and discharge tubes, the intake tube connected to the pump of an existing windshield washer assembly and discharge tube being connected, through a manifold to the discharge nozzles adjacent to the windshield. In another form of the invention, the discharge from the heat exchanger is directed along a header or manifold of a nozzle assembly adjacent to and for washing the rear window of the automobile. In still another form of the invention, the heat exchanger forms an essentially closed reservoir so that the exhaust pipe does not come in contact with the fluid flowing therethrough. The process includes heating the windshield cleaning liquid by heat from the exhaust of an engine and then discharging the same in a heated condition onto the windshield or window of an automobile.

4 Claims, 3 Drawing Sheets 4,832,262

AUTOMOBILE WINDOW WASHING APPARATUS AND HEAT EXCHANGER THEREFOR

BACKGROUND OF THE INVENTION

1. Field of the Invention

This invention relates to an automobile window washing apparatus and process and a heat exchanger therefor.

2. Description of the Prior Art

In the past, substantially all automobiles have been equipped with a cleaning liquid reservoir and a pump which delivers this cleaning liquid to a manifold leading to one or a plurality of nozzles which direct the liquid onto the windshield of the automobile, the purpose being to provide liquid and perhaps detergent so that the windshield wiper will wash the windshield clean, especially during the operation of the vehicle. While a mixture of water and detergent is generally employed for the cleaning liquid, in areas where the temperature is below freezing, antifreeze has been added to the water in order to maintain the water in liquid condition. The temperature of the water in the reservoir therefore, can drop well below the freezing point and if sprayed onto a windshield which has an a accumulation of ice or snow, will contribute little to cleaning of the windshield. Indeed, the liquid will tend to smear along the surface of the windshield and perhaps obscure the vision through the windshield rather than to improve such vision.

The present invention will enable the instantaneous preheating of the liquid so that hot water or hot cleaning liquid is delivered to the windshield or to the back window, as the case may be.

SUMMARY OF THE INVENTION

Briefly described, the present invention includes a conventional windshield washing system which comprises a liquid container or reservoir which contains either water or a mixture of water, detergent and/or perhaps antifreeze. A flexible hose or eduction tube leads from the bottom portion of the reservoir to the suction side of a pump, the discharge side of the pump being connected through a flexible tube to the heat exchanger which is strapped around one side of the exhaust pipe of the engine. A flexible tube leads from the chamber of the heat exchanger to the nozzle manifold and, thence, to the nozzle or nozzles for delivery of steam and/or heated liquid to the windshield, to another window. In one embodiment, the pipe itself forms a part of the heat exchanger while in another embodiment, the heat exchanger is closed so as to form a heating chamber.

BRIEF DESCRIPTION OF THE DRAWINGS

The process carried out by the application including progressively and substantially instantaneously heating discrete increments of cleaning liquid by manifold heat prior to its delivery to the nozzles.

DESCRIPTION OF THE PREFERRED EMBODIMENTS

Figure 1:
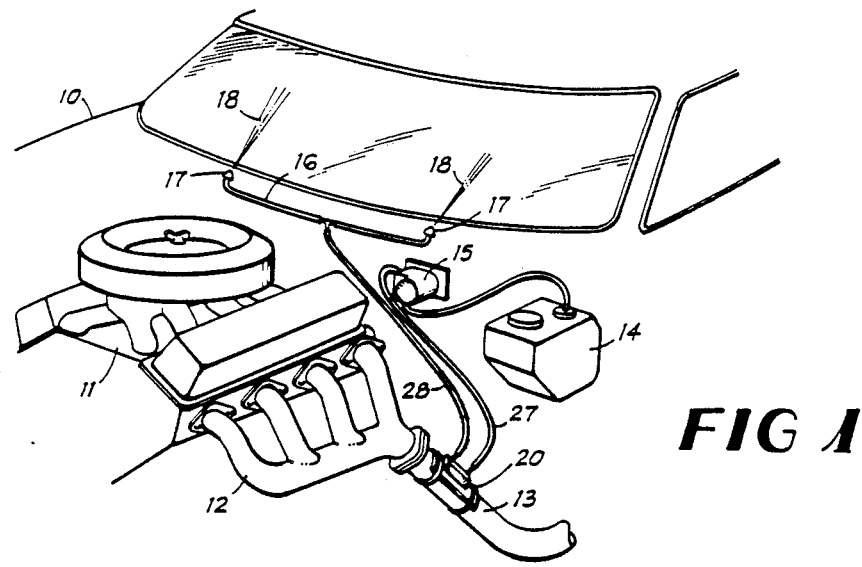
FIG. 1 is a schematic perspective view of a conventional automobile and engine and having a windshield washer system which has been modified, according to the present invention, to produce the windshield deicer-cleaner of the present invention.
Figure 2:
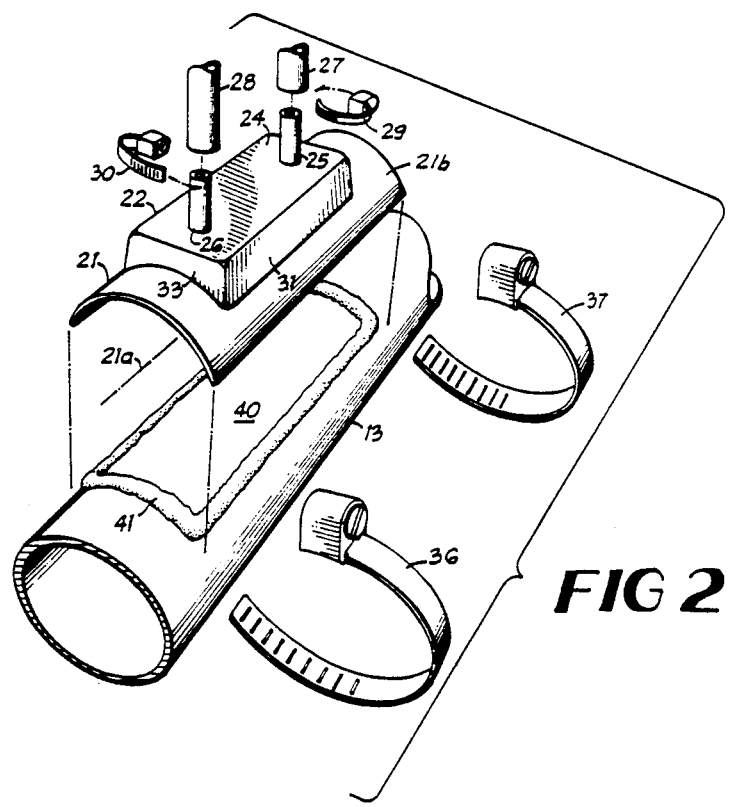
FIG. 2 is an enlarged exploded perspective view of portion of the exhaust pipe of the engine depicted in FIG. 1, the heat exchanger of the present invention being affixed to the exhaust pipe.

Referring now in detail to the embodiments chosen for the purpose of illustrating the present invention, numeral 10, in FIG. 1, denotes a conventional automobile provided with an internal combustion engine 11, having an exhaust manifold 12 and an exhaust pipe 13. When the engine is running, hot gases from the engine 11 pass through the metal manifold 12 and then through metal exhaust pipe 13.

The automobile 10 is equipped with a conventional windshield washer system which includes a liquid reservoir 14 and a pump 15. A flexible hose or tube 16 extending from the reservoir 14 to the intake of the pump 15 enables the pump 15 to take a suction on the reservoir 14 for the delivery of liquid therefrom. The discharge of the pump 15 is normally connected by means of a flexible hose or tube 17a (shown in broken lines) to the discharge manifold 16 and, thence, to a plurality of discharge nozzles 17. The nozzles 17 are mounted in front of the lower portion of the windshield 19 and, when the system is actuated, directs spray on intermittent streams 18 of the liquid against the windshield 19 of the automobile 10. The structure thus far described is conventional and found in most automobiles.

According to the present invention, the flexible hose or tube 17a, which is normally connected between the discharge of pump 15 and the manifold 16, is severed to provide two ends which permits the installation of the heat exchanger, denoted generally by numeral 20, as will be described hereinafter. In more detail, the heat exchanger 20 as depicted in FIGS. 1, 2 3 and 4 includes a body having an arcuate sheet metal base plate or skirt 21 which is curved to provide a concaved bottom surface of approximately the same diameter as the outside diameter of the exhaust pipe 13.

Struck from the central portion of the base plate 21 is a chamber defining member which is preferably a rectangular cup shaped liquid or fluid confining steam generating tank or member denoted generally by numeral 22. This cup shaped chamber defining member 22 partially defines a central liquid or fluid chamber 23 in which the increments of liquid washing or cleaning solution or water from pump 15 is to be flash heated.

Member 22 includes a flat, rectangular, top plate 24 provided with a pair of longitudinally aligned, spaced, opposed, parallel, outwardly projecting, rigid nipples or tubes 25 or 26 which communicate at spaced locations with chamber 23 and receive over their outer ends, the end portions of flexible hoses or tubes 27 and 28, respectively. These end portions of tubes 27 and 28 are clamped in place on their respective nipples 25 and 26 by adjustable clamps 29 and 30. The other end of flexible tubes 27 and 28 are respectively connected to the discharge side of pump 15 and to the intake end of the fluid discharge header or manifold 16.

Member 22 also includes a pair of opposed side walls 31 and 32 and a pair of opposed end walls 33 and 34 extending between the ends of the side walls 31 and 32. The upper edges of walls 31, 32, 33 and 34 are in a common plane and connect to the perimetral edges of top plate 24 while the lower edges of such walls are connected to the inside perimeter of base 21. Hence, the outer end portions of base 21, outwardly of the member 22 form curved, aligned, oppositely extending, end wings or clamp receiving members 21a and 21b for receiving thereover the clamps 36 and 37.

In the embodiment of FIGS. 1, 2, 3 and 4, the bottom or inner side of the heat exchanger is formed by the exterior peripheral portion 40 of pipe 13 which is below the heat exchanger 20. For preventing leakage of fluid, a gasket or seal 41, larger than the inside perimeter of the base plate 21 and smaller than the outside perimeter of base plate 21, is provided between pipe 13 and the inner concaved surface of base plate 21. This seal 41 is preferably formed of exhaust pipe cement, even though other adhesives, such as gasket compound or gasket material can be employed.

Figure 3:
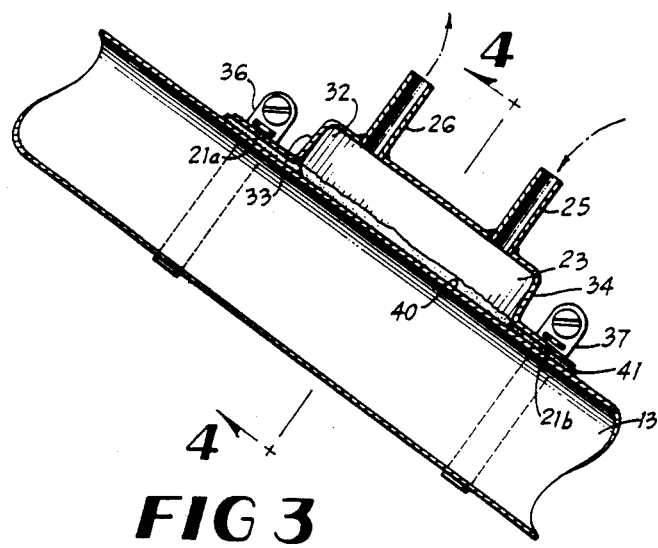
FIG. 3 is a fragmentary side elevational view of the structure depicted in FIG. 2.
Figure 4:
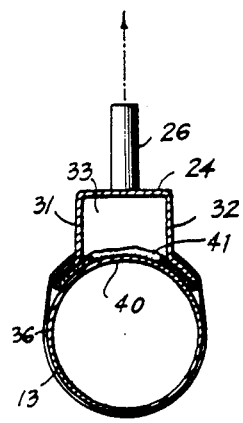
FIG. 4 is a vertical sectional view taken substantially along line 4—4 in FIG. 3.

The clamps 36 and 37, as seen in FIGS. 1 and 3, are spaced axially from each other and respectively pass over the outside convex surfaces of wings 21a and 21b. Thence, clamps 36 and 37 extend around the exhaust pipe 13, thereby urging the base plate 21 into a sealed and seated condition against exhaust pipe 13. If the gasket 41 is adhesive or cement, it will be exuded between the abutting outer periphery of pipe 13 and the inner surface of base plate 21.

Figure 7:
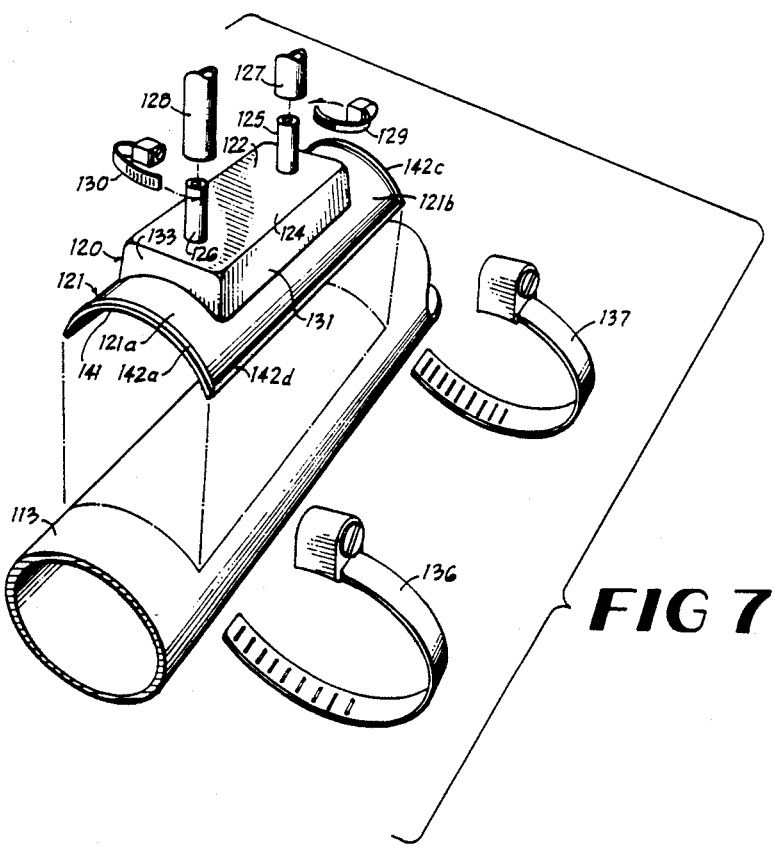
FIG. 7 is a view similar to FIG. 2 but showing a modified form of the heat exchanger of the present invention.
Figure 8:
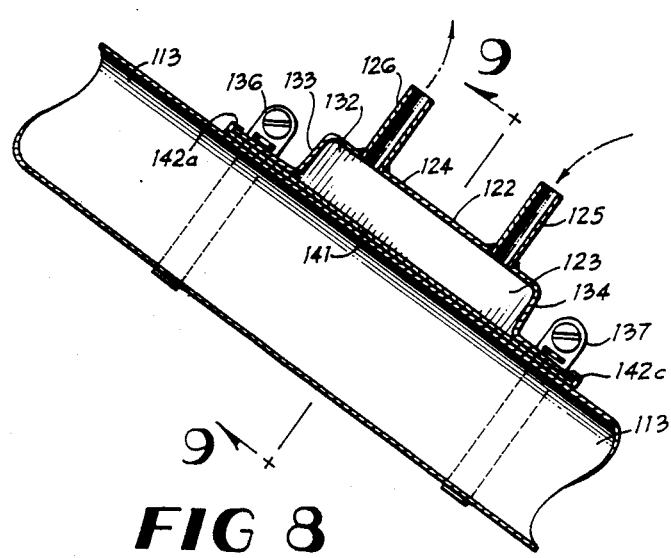
FIG. 8 is a fragmentary side elevational view of the structure depicted in FIG. 7.
Figure 9:
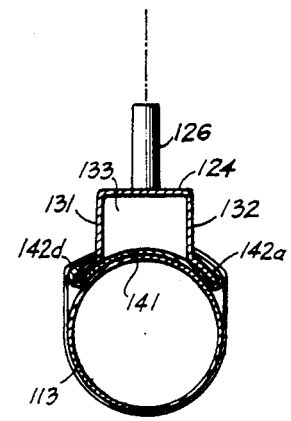
FIG. 9 is a vertical sectional view taken substantially along lines 9—9 in FIG. 8.

In the embodiment of FIGS. 7, 8 and 9, in place of the gasket 41 for heat exchanger 20, there is a bottom plate 141 in heat exchanger 120. The structure of heat exchanger 120 is otherwise generally identical to heat exchanger 20. Thus, heat exchanger 120 has a mounting plate or base plate 121 which form wings or clamp receiving members 121a, 121b, a cup member 122 having a chamber 123, a top plate 124, rigid tubes 125, 126, side walls 131, 132 and end walls 133, 134. Flexible hose or tubings 127, 128 are received on rigid nipples 125, 126 being clamped thereon by clamps 129, 130. The heat exchanger 120, itself, is clamped to exhaust pipe 113 by clamps 136, 137 all in the identical manner as the preceeding embodiment.

In the present embodiment the bottom plate 141 is an initially rectangular sheet of metal longer and wider than the dimensions of the base plate 121. The plate 141 is curved about a longitudinal axis so that its inside surface is convex to conform to the curvature of the base plate 121 and its outside surface is concaved to conform to the curvature of the exhaust pipe 113. The bottom plate 141 is secured to the base plate 121 by placing it in concentric abutting or contiguous relationship to the base plate 121 and folding or bending the edge portions 142a, 142b, 142c, and 142d over the edges of the base plate 141. Thus, the bottom portion of chamber 123 is closed.

When the heat exchanger 120 is installed, the inside concaved surface of bottom plate 141 is placed in juxta-position against the pipe 113 and the clamps 136, 137 passed around the outer convex surfaces of the wings 121a and 121b and around the pipe 113 as seen best in FIG. 8.

As the preceeding embodiment, the flexible hose or tube 127 is connected to the discharge side of a pump, such as pump 15, while the flexible hose or tube 128 is connected to the header or manifold such as header 16.

Hence, liquid or washing fluid will be fed from the reservoir, such as reservoir 14 by the pump, such as pump 15, through the heat exchanger 120, via the header, such as header 16, and sprayed by the nozzles, such as nozzles 17, onto the windshield, such as windshield 19.

The embodiment of FIGS. 7, 8 and 9 has the added advantage that the heat exchanger 120 may be selectively located and relocated at any of a number of positions along the length of the exhaust pipe 113. Generally an exhaust pipe 113, adjacent to the exhaust manifold of an operating engine is at a temperature of about 800° F. to about 900° F. The temperature of the exhaust pipe 113, however, progressively drops as the pipe increment is further and further from the manifold. Therefore, through adjustment of the position of the heat exchanger 120 along the length of the exhaust pipe will change the temperature at which the water or washing solution is delivered to the windshield. The heat exchanger 20 and 120 dos not have to be of any great size. For example, the embodiments of FIGS. 7, 8 and 9 the device is only 5½ inches long and 2 inches wide while the chamber 123 has a volume of about 1 ounce.

When the heat exchanger 20 or 120 is installed at an incline, as depicted in FIGS. 3 and 8, the liquid from the pump, such as pump 15, should be introduced into the lower portion of the chamber 23 or 123 and discharged from the upper portion thereof, as indicated by the arrows.

Of course, when the liquid is incrementally introduced in intermittent small volumes into the heat exchanger 20 or 120, there will be flash steam generated. Thus, some steam in admixture with the liquid will be delivered to the windshield.

Figure 5:
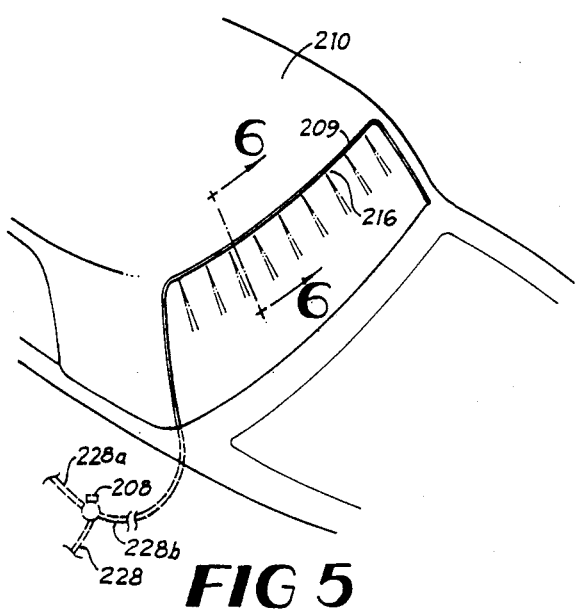
FIG. 5 is a schematic perspective view of the rear portion of an automobile which is provided with the nozzle assembly constructed in accordance with the present invention.
Figure 6:
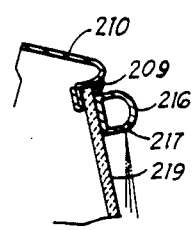
FIG. 6 is a sectional view taken substantially along line 6—6 in FIG. 5.

In the embodiment of FIGS. 5 and 6, it is seen that, if desired, the discharge hose or tube 228, which leads from heat exchanger, such as heat exchanger 20 or 120, can be selectively directed to either the windshield or the rear window 219 of an automobile 210. In such an arrangement, the discharge hose or tube 228 leads to one side of a solenoid valve 208. The two discharge sides of valve 208 are connected to a front hose 228a and to the back hose 228b. In one condition of valve 208, the discharge of hose 228 is directed to hose 228a and in another condition of valve 208, the discharge of hose 228 is directed to hose 228b. The actuation of valve 208 is controlled electrically from the interior of the automobile 210 in conventional manner.

Hose 228a leads through the automobile 210 to the front, such as header 16, while hose 228b leads to the rear header 216. Header 216 is disposed along the upper edge of the rear window 219 adjacent to the upper bezel 209. The header 216 has a plurality of downwardly opening holes 217 from which the fluid fed via hose 228b and header 216, is directed onto the rear window 219.

OPERATIONS

From the foregoing description, both the installation and operation of the foregoing devices should be apparent.

It is contemplated that the heater exchanger 20 or 120 will be supplied as a separate device for converting conventional window washing systems. Also supplied in a kit would be the mecessary clamps 29, 30, 36, 37, 129, 130, 136, 137 and sufficient length of flexible hose or tubing and, if the heat exchanger 20 is supplied, a gasket or gasket material should be supplied.

The heat exchanger 20 is installed on the exhaust pipe 13 by providing a gasket 41 and applying the clamps 36 and 27 as described above. The heat exchanger 20 is connected to the conventional windshield washing system by severing the hose tube 17a leading from the discharge side pump 15 and connecting the severed ends to rigid tubes 25 and 26.

The same procedure is followed for installing heat exchanger 120, except that no gasket is necessary. The heat exchanger 120 may also be adjusted up or down the exhaust pipe 113 to vary the temperature of heat delivered to the heat exchanger 120.

The system thus described is used by actuating, in the usual way, the pump, such as pump 15. When actuated, pump 15 delivers spirts or increments of liquid, i.e. water containing perhaps a detergent and/or antifreeze, from the tank or reservoir 14 to the heat exchanger 20 or 120, as the case may be. These increments of water, when striking the peripheral portion 40 or the inside convex surface of bottom plate 141, convert totally or partially to steam and this steam expands rapidly, passing through tube 28 or 128 to the nozzle header 16 and thence out of nozzles 17, being directed against the snow or ice or simply the outside surface of the window.

Usually some water is delivered with the steam, due to condensation or due to entrainment. Also, the antifreeze and detergent may be entrained in the steam, or steam and water, passing from the nozzles 17.

The steam and/or heated liquid quite rapidly melts the frost accumulated on the windshield or windows and is quite effective, in cooperation with the windshield wipers in removing ice accumulated on the windshield or window. Since the exhaust pipe heats quite soon after starting the engine, no appreciable delay is encountered in supplying quite hot fluid to the windshield or windows. Even with no ice or front, a more effective, washing solution is supplied, due to its elevated temperature.

If the embodiment of FIGS. 5 and 6 are used, the valve 208 will permit the operator to select whether to direct the fluid onto the front windshield 16 or rear window 216.

While I have described the heat exchangers 20 and 120 as being clamped on the exhaust pipe of an automobile the heat exchanger 20 or 120 can be attached to other portions of the exhaust system, such as on the exhaust manifold. Also, while I have described the preferred embodiments of the heat exchanger, other forms of the heat exchanger can be used. Hence, it will be obvious to those skilled in the art that many variations may be made in the embodiments chosen for the purpose of illustrating the present invention and full resort may be had to the doctrine of equivalents without departing from the scope of this invention as defined by the appended claims.

I claim:

1. A window or windshield wash system for delivering liquid in a heated condition or as steam against the external surface of the window or windshield of an automobile, the automobile including an engine having an exhaust pipe through which the exhaust gases from the combustion of fuel is discharged and wherein the exhaust pipe is heated by such exhaust gases, comprising:
   (a) a reservoir for receiving and containing said liquid;
   (b) a pump having a suction side and a discharge side;
   (c) a nozzle mounted on said automobile;
   (d) a heat exchanger for being removeably mounted on said exhaust pipe, said heat exchanger including a concaved bottom plate curved to conform to the curvature of a portion of said exhaust pipe, a top plate spaced from said bottom plate, side walls extending between the edges of said top plate and said bottom plate for forming with said top plate and said bottom plate, a rectangular chamber partially around said exhaust pipe, spaced nipples extending from said top plate outward away from said bottom plate in generally radial directions;
   (e) the ends of said heat exchanger extending axially of said exhaust pipe for forming opposed wings;
   (f) a first flexible tube communicating by one end with said reservoir and by its other end with the suction side of said pump for delivering said liquid from said reservoir to said pump;
   (g) a second flexible tube connected by one end and communicating with the discharge side of said pump and connected by its other end to and communicating with one of said nipples for delivering liquid from said pump through said one of said nipples and into said chamber;
   (h) a third flexible tube connected by one end to and communicating with the other of said nipples and connected by its other end to and communicating with said nozzle for delivering heated liquid in the form of liquid and/or in the form of steam through said nozzle and toward said window or windshield; and
   (i) a pair of spaced clamps surrounding said exhaust pipe and passing respectively over the wings of said heat exchanger for clamping said bottom plate against said portion of said exhaust pipe so as to urge said bottom plate into contact with said portion of said exhaust pipe, said clamps being moveable outwardly of said wings for releasing said heat exchanger.

2. The window or windshield washing system defined in claim 1 wherein said heat exchanger is clamped to an inclined portion of said exhaust pipe, whereby said other of said nipples is above said one of said nipples so that when liquid in said chamber is heated, the steam will tend to pass out of other of said nipples.

3. The window or windshield washing system defined in claim 1 wherein said pump delivers said liquid in pulses to said chamber so that the liquid, passing through said one of said nozzle, is directed against the inner surface of said bottom plate.

4. The window and windshield washing system defined in claim 1 wherein said bottom plate extends beyond said chamber to form said wings and said clamps extend around said end portions.

* * * * *